(12) United States Patent
Vasudevan et al.

(10) Patent No.: US 6,715,077 B1
(45) Date of Patent: Mar. 30, 2004

(54) SYSTEM AND METHOD TO SUPPORT VARYING MAXIMUM CRYPTOGRAPHIC STRENGTH FOR COMMON DATA SECURITY ARCHITECTURE (CDSA) APPLICATIONS

(75) Inventors: Narayanan Vasudevan, Gaithersburg, MD (US); Sohail Malik, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,073

(22) Filed: Mar. 22, 2000

Related U.S. Application Data
(60) Provisional application No. 60/125,813, filed on Mar. 23, 1999.

(51) Int. Cl.[7] .................................................. G06F 11/00
(52) U.S. Cl. ..................... 713/191; 713/189; 713/200
(58) Field of Search .................................. 713/191, 189, 713/187, 200

(56) References Cited

U.S. PATENT DOCUMENTS

| | | | | |
|---|---|---|---|---|
| 5,341,425 A | * | 8/1994 | Wasilewski et al. | 380/212 |
| 6,308,266 B1 | * | 10/2001 | Freeman | 713/156 |
| 6,378,073 B1 | * | 4/2002 | Davis et al. | 713/200 |
| 6,470,447 B1 | * | 10/2002 | Lambert et al. | 713/151 |
| 6,557,020 B1 | * | 4/2003 | Amano et al. | 708/491 |

* cited by examiner

Primary Examiner—Norman M. Wright
(74) Attorney, Agent, or Firm—David M. Shofi

(57) ABSTRACT

An Improved CDSA system (CDSA-I) includes a standard CDSA framework coupled via an Application Program Interface to an application requiring cryptographic support. During manufacture, a cryptographic control privilege is incorporated into the application, as part of an exemption mechanism, which exemption may or may not be enforced by the CDSA framework. For maximum cryptographic strength, an application must be signed by a private key controlled by the CDSA framework vendor. Inside the CDSA framework, the corresponding public key is used to verify at runtime those applications that were appropriately signed. The CDSA framework is coupled via a Service Provider Interface (SPI) to a plurality of pluggable modules for performing cryptographic operations, storing signed digital certificates for applications, and trust policies relating to cryptographic strengths. The framework is initialized to provide the cryptographic support for the application. The application requests a a crypto context representing the algorithm ID, key and key length from the CDSA framework at runtime to be used in subsequent API calls to the CDSA framework. The application requests a privilege status and the CDSA framework uses its internal public key at runtime to determine if the application is privileged to perform strong crypto for the current thread using the current crypto context; this is determined by verifying that the application and its credentials were signed by the private key controlled by the CDSA framework vendor. A flag is set in the application if the application will be entitled to strong crypto when the application actually calls the APIs to encrypt data. Otherwise, the flag is not set and it will be stopped from using strong crypto when it calls the APIs to encrypt data.

10 Claims, 4 Drawing Sheets

PRIVILEGED CDSA APPLICATION

OVERVIEW OF ENCRYPTION SEQUENCE FOR STRONG AND WEAK CRYPTO APPLICATIONS

REQUEST EXEMPT_ALL PRIVILEGE (OPTIONAL)

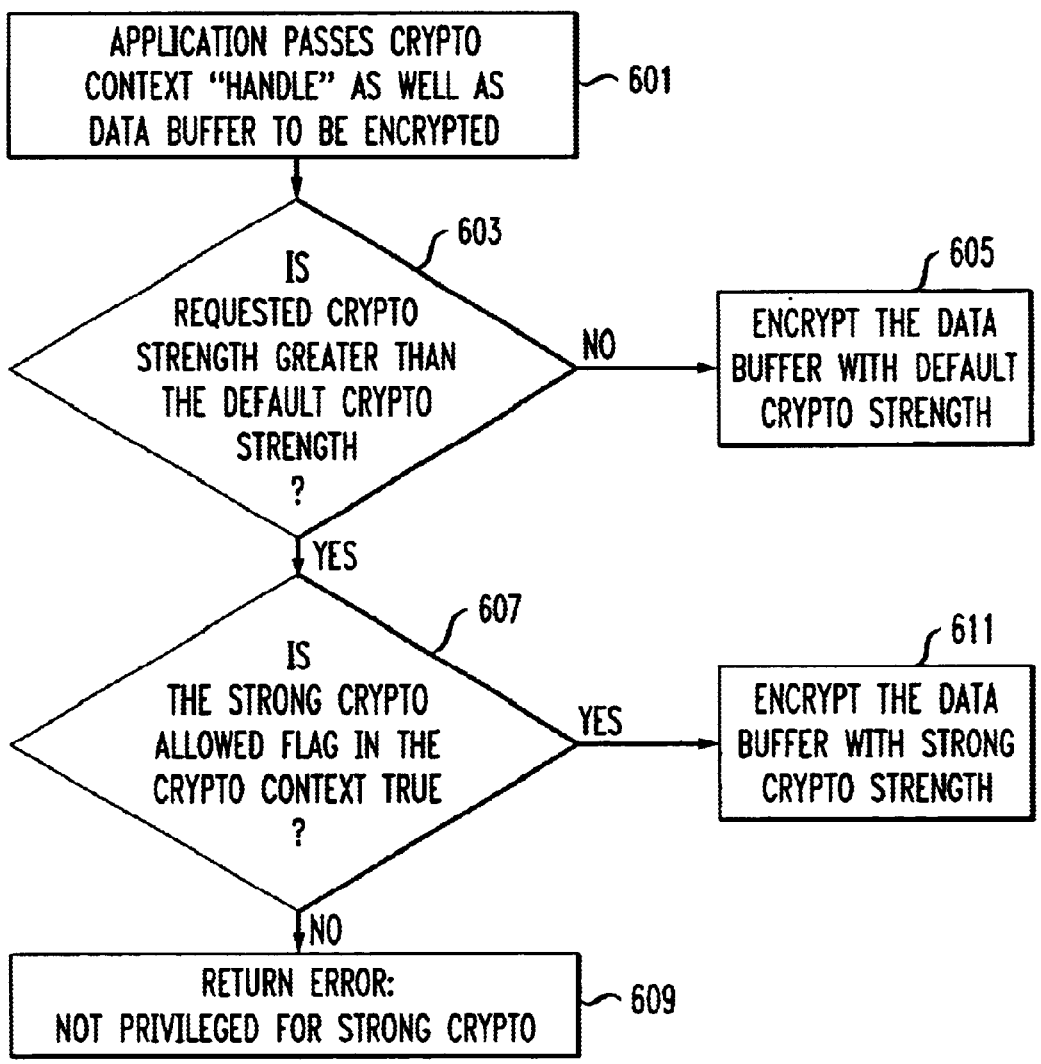

SYSTEM AND METHOD TO SUPPORT VARYING MAXIMUM CRYPTOGRAPHIC STRENGTH FOR COMMON DATA SECURITY ARCHITECTURE (CDSA) APPLICATIONS

This application claims the benefit of the filing date of Provisional Application Serial No. 60/125,813 filed Mar. 23, 1999, and assigned to the same Assignee as that of the present invention.

BACKGROUND OF THE INVENTION

1. Field of Invention

This invention relates to cryptographic applications incorporating Common Data Security Architecture (CDSA). More particularly, the invention relates to systems and methods to support varying maximum cryptographic strength for CDSA applications.

2. Background Discussion

Vendors that manufacture applications that require encryption/decryption incorporate cryptographic libraries in their applications. However, for export, cryptography is controlled by Government regulations. By default, cryptographic strength is constrained to weak crypto (e.g., 56 bit DES.). Special industries, for example, financial, can use "strong" crypto (e.g., 168 bit DES.). Vendors usually statically link cryptographic libraries into their applications. Vendors cannot easily change from one cryptographic library to another because the Application Programming Interfaces (APIs) vary between different vendors' libraries. The Common Data Security Architecture (CDSA) provides programmable interfaces for cryptographic and digital certificate services using a "plug and play" model. The CDSA Specification is attached as Appendix 1 and is available from the Intel Corporation, 5200 N.E. Elam Young Parkway, Hillsboro, Oreg. 97124-6497. The Specification is also available from cdsa@dbmg.com. With CDSA, security service providers may support varying strengths of cryptographic algorithms. Normally for a given implementation of CDSA, all applications will be allowed to use the union of all algorithms in cryptographic strengths provided by the registered service providers.

However, there is sometimes a need to allow the same implementation of CDSA to support the cryptographic needs of multiple applications, each of which needs to be constrained to a particular maximum cryptographic strength. For example, financial applications in non-U.S. jurisdictions may be allowed to use 168 bit strength cryptography, while non-financial applications may only be allowed to use 56 bit strength cryptography. What is needed is an improved system and a method to allow a single CDSA implementation to control the maximum cryptographic strength of various applications based on a configurable cryptographic control policy enforced by the CDSA framework.

SUMMARY OF THE INVENTION

An object of the invention is a system and method to provide an application with varying cryptographic strength based on a configurable cryptographic control policy implemented in the application.

Another object is a system and method creating a crypto context for an application implemented by the CDSA framework.

Another object is a data structure in a CDSA framework identifying exemptions or privileges contained in applications for varying the cryptographic strength of the application.

These and other objects, features and advantages are achieved in an improved CDSA system(CDSA-I) including a standard CDSA framework coupled via an Application Program Interface, to an application requiring cryptographic support. During manufacture, a cryptographic control privilege is incorporated into the application, as part of an exemption mechanism, which exemption may or may not be enforced by the CDSA framework. For maximum cryptographic strength, an application must be signed by a private key controlled by the CDSA framework vendor. Inside the CDSA framework, the corresponding public key is used to verify at runtime those application that were appropriately signed. The CDSA framework is coupled via a Service Provider Interface (SPI) to a plurality of pluggable modules for performing cryptographic operations, storing signed digital certificates for applications, and trust policies relating to cryptographic strengths. The framework is initialized to provide the cryptographic support for the application at which time it reads a vendor-signed cryptographic control policy file that determines the cryptographic key lengths at which various algorithms are considered cryptographically strong. All APIs for cryptographic operations require a crypto context so the application then requests the CDSA framework to create a crypto context given an algorithm ID, key and key length. By default, all crypto contexts are assigned the default or "weak" level of crypto. If the application has been authorized to use strong crypto by virtue of being signed, it next calls the API to request an exemption. The CDSA framework using a data structure determines if the application is signed or privileged to perform strong crypto according to the crypto context based on the previously read cryptographic control policy file. A flag is set in framework-controlled crypto context data structure if the application is entitled to strong crypto. Otherwise, the flag is not set and the application will be stopped from using strong crypto when the APIs is called to encrypt data.

DESCRIPTION OF DRAWINGS

The invention will be further understood from a following detailed descriptions of a preferred embodiment, taken in conjunction with an appended drawing, in which:

FIG. 6 is a flow diagram determining the crypto strength of an application in the system of FIG. 1.

DETAILED DESCRIPTION OF PREFERRED EMBODIMENT

Figure 1:
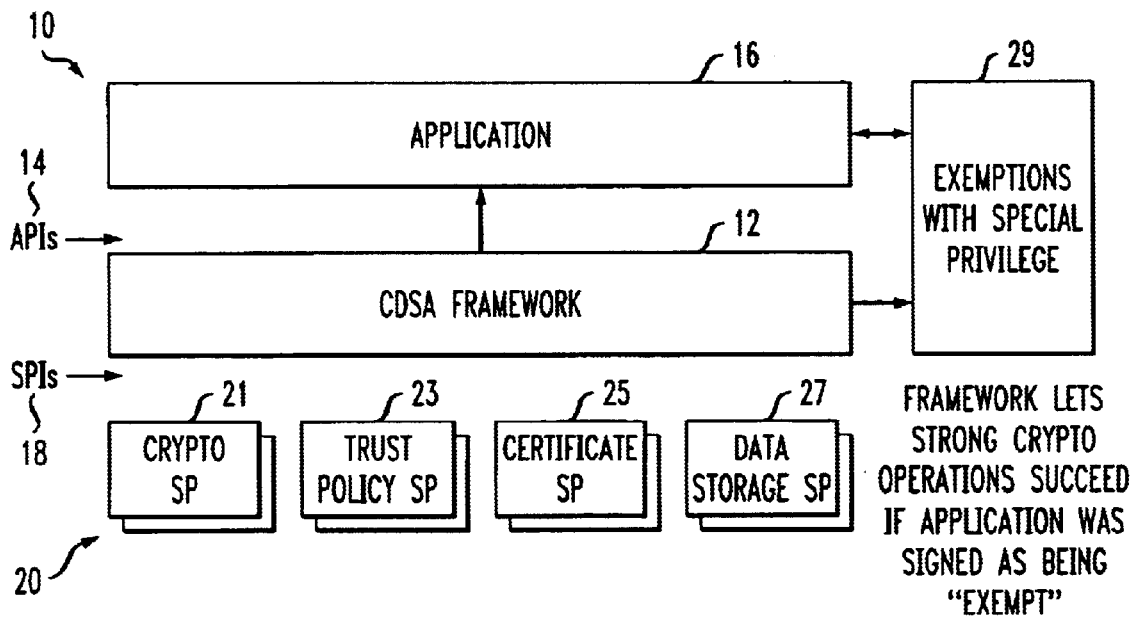
FIG. 1 is a representation of a cryptographic application interfacing through an API with a Common Data System Architecture—Improved system (CDSA-I) including a CDSA framework and incorporating the principles of the present invention.

In FIG. 1, a Common Data System Architecture—Improved system (CDSA-I) 10 is shown including a CDSA framework 12 coupled through a CDSA Application Program Interface (API) 14 to an Independent Software Vendor (ISV) application 16 into which cryptographic libraries are incorporated for security purposes. The CDSA framework is partially described in Appendix I and includes a Common Security Services Manager (CSSM) interfacing the application 16 through the API and through Service Provider Interfaces (SPIs) 18 to add-in or pluggable modules 20. Applications 16 request security services through the CSSM which maps API calls to the appropriate pluggable modules. The security services are performed by the pluggable modules which support encryption; digital certificate management; key recovery; trust policy and data storage in the application. These Add in modules may also be provided by ISVs to augment the set of available security services or as competitive products.

A crypto module 21 performs cryptographic operations including encryption, decryption, digital signing, keypair generation, key exchange, and random number generation. A Trust Policy module 23 implements policies defined by authorities and institutions such as VeriSign and MasterCard. Each Trust Policy module embodies the semantics of a trust model based on using digital certificates as credentials. Applications may use a digital certificate as an identity credential and/or an authorization credential. A Certificate Library 25 provides format-specific, syntactic manipulations of memory-resident digital certificates and certificate revocation lists. A Data Storage module 27 provides persistent storage for certificates and certificate revocation lists. Certificate Libraries and Data Storage libraries make up the existence and manipulation of certificates and revocation lists orthogonal to the persistence of those objects. The Add-In modules must implement some or all of the CSSM defined security API 14.

The (CDSA-I)10 supports various modes of security operation, providing different levels of functionality for the applications 16. To support these various modes, a privilege or exemption mechanism 29 is implemented within the architecture. The exemption or privilege mechanism 29 provides differing levels of security services to applications that possess different sets of privileges. The word "privilege" and "exemption" are used synonymously and interchangeably.

The basic aspects of the privilege mechanism for CDSA-I are:

Applications may be granted special privileges with respect to the CDSA-I architecture.

The CDSA framework within the architecture 10 provides a base level of services to non-privileged clients and an enhanced level of service to privileged clients.

Application layer modules using the CSSM API 14 may be granted special privileges based upon the exemption module 29. The privileges allow these application layer modules to obtain specialized services that are above and beyond the set of services provided by the CDSA framework to non-privileged applications and layer modules.

Privileges are associated with an application module via a set of signed manifest credentials. The signed manifest credentials are placed in a directory named Meta-INF at the same level as the privileged application module. Thus, if the path name for a privileged application is Alpha/Beta/Gamma/PrivAPP.exe, the credential file resides in the directory, Alpha/Beta/Gamma/Meta-INF/, and are named PrivAPP.sf, PrivAPP.mf, and PrivAPP.dsa.

The set of signed credentials for a privileged application includes a Manifest File (MF) in which there is a Privileged Vector attribute. The value of this attribute describes the privileges for the related application module. At the time an application module is shipped, a determination is made by a development house in liaison with relevant Government agencies, regarding the set of privileges that may be granted to the application. The application module is then signed with the appropriate set of privileges.

The CDSA architecture implements a number of built-in policy checks for controlled functions of the security services (i.e., compliant with the U.S. Export regulations). Applications may request exemptions from these built-in checks. The exemption is granted if the calling application provides credentials that:

Are successfully authenticated by the framework (i.e., the credentials matching the application module requesting privileges are signed by the CDSA framework vendor).

Carry attributes that allow the requested exemption (i.e., the total set of privileges assigned to the application includes the exemption being requested).

Exemptions are granted per application thread, if threads are supported in the operating system environment. The exemptions and privileges cannot be inherited by spawned processes or spawned or sibling threads. Each process or thread must present credentials and obtain its own exemption status.

The privilege or exemption mechanism allows the CDSA-I to support various modes of operation providing different levels of services to different application layer modules. The privilege mechanism in its full form is relevant only for the exportable versions of the CDSA framework within CDSA-I. When the CDSA framework contains U.S. domestic cryptographic control policy files, the framework provides a full set of services to all applications. It is not necessary to request or obtain privileges when working with U.S. domestic versions of the CDSA framework. However, in order to maintain compatibility between U.S. domestic and U.S. exportable versions of the CDSA-I architecture, the privileged APIs work as expected in both cases. The only difference being that with a U.S. domestic version of the CDSA framework, the actual credential files are not checked prior to granting of privileges to a requesting application. An application can request and be granted any set of privileges without the framework checking the application credentials.

The CSSM API includes data structures which enable a series of functions to be performed as follows:

1. CSSM_Exemption Mask:
   (a) This data structure defines a bit mask of exemptions or privileges pertaining to the CDSA framework. Exemptions are defined and correspond to built-in checks performed by the CDSA framework and the module manager. The caller must possess the necessary credentials to be granted the exemptions.

2. CSSM_RequestsExemption:
   (a) This function authenticates the application and verifies whether the application is authorized to receive a requested exemption. Authentication is based on the successful verification of the application signed manifest credentials. After the authentication step, the framework ensures that the credentials authorize the application to require the requested exemptions. The CDSA framework 12 has built-in knowledge of the allowable routes of trust for authenticating application credentials.

The credential verification step is bypassed when the CDSA framework is operating with a set of U.S. domestic cryptographic control policy files The requested exemptions are granted automatically in this case, and an AppFileName and an AppPathName parameters may be left as null.

An exemption mask defines a requested exemptions. The application file name and application path name specify the location of the application module, and allow the framework to locate the application's credentials.

Applications may invoke this function multiple times. Each successful verification replaces the previously granted exemptions. The exemptions are not inherited by spawned processes or spawned threads. If an ExemptionRequest parameters is 0, all privileges are dropped for that thread.

The AppFileName and the AppPathName parameters may be left as null if it is known for sure that the requested exemptions are a subset of the commonly possessed exemptions. In such cases, the actual credentials are not checked by the framework.

(b) Parameters:
  (i). ExemptionRequests (Input):
    A bit mask of all exemptions being requested by the caller. If the value is CSSM_Exempt_All, the caller is requesting all possible privileges that may be granted or accorded the credentials that are presented and checked.
  (ii) AppFileName (Input):
    The name of the file that implements the application (containing its main entry point). This file name is used to locate the application's credentials for purposes of verification and authentication by the framework. Note that the file name is expected not to have a leading or trailing path name to separate it. ("/" or "\" depending on the platform of use).
  (iii) AppPathName (Input):
    The path to the file and to implement the application (containing its main entry point). This path name is used to locate the application's credentials for purposes of application authentication by the framework. Note that the path name may be a fully qualified path name or a relative path name from the current working directory. In either case, it is expected to contain a trailing path name separated ("\" or "\" depending on the platform of use).
  (iv) Return Value:
    A CSSM_OK return value signifies the verification operation was successful and the exemption has been granted. When CSSM_FAIL is returned, an error has occurred.

3. CSSM_EXEMPT_ALL:
  (a) This is a bit mask that represents all the privileges defined by the CDSA framework. Using this bit mask on the CSSM_RequestExemption API, an application signed with all the privileges could be sure that it received all of the privileges possible in the CDSA framework. Other bitmasks include:
    (i) CSSM_Exempt_Multi_Encrypt_Check (allows exemption from the check that stops a buffer from being encrypted multiple times);
    (ii) CSSM_Strong_Crypto_With_KR (allows use of strong crypto by virtue of making a key recovery block available);
    (iii) CSSM_Exempt_LE_KR (allows exemption from law enforcement restrictions on crypto);
    (iv) CSSM_Exempt_ENT_KR (allows exemption from optional enterprise restrictions on crypto).

4 CSSM_CheckCSSMExemption:
  (a) This function return exemptions possessed by the current thread. If the exemption returned is non-zero, it implies that the CSSM_RequestExemption API has been called to request a specific set of exemptions.

(b) Parameters:
  (i) Exemptions (Output): A bit-mask of all exemptions possessed by the calling thread.
  (ii) Return Value:
    A CSSM_OK return value signifies the operation was successful and the exemption returned is valid. When CSSM_FAIL is returned, an error has occurred.

5. CSSM_Init: (a) This CDSA API must be called before any other API in order to activate the CDSA framework.

6. CSSM_EncryptData: (a) This CDSA API is the one that actually performs data encryption. It requires a crypto context (discussed previously), an input data buffer containing data to be encrypted and an output data buffer in which encrypted data will be written.

The operation of CDSA-I(10) will now be described in conjunction with FIGS. 2–6.

Figure 2:
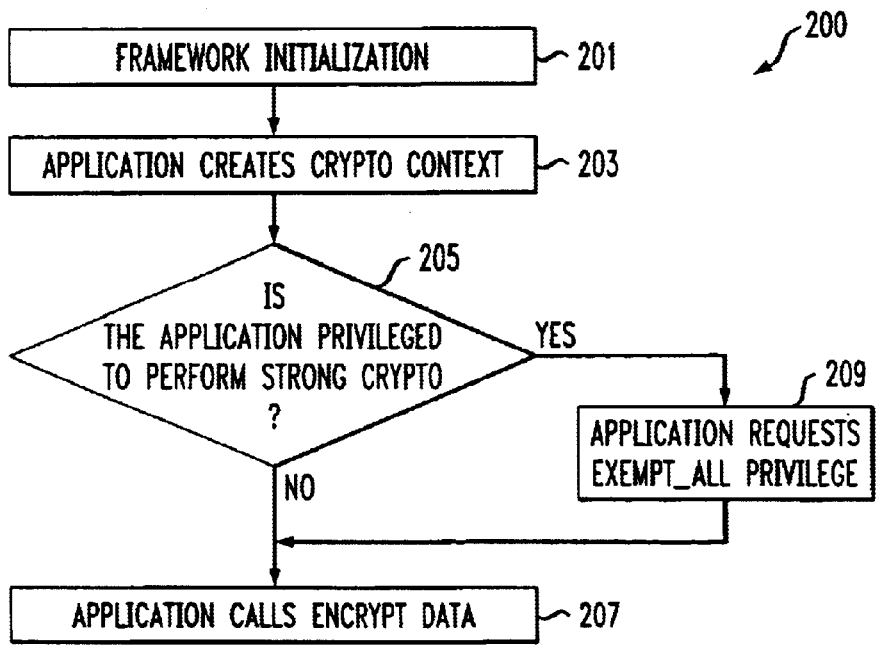
FIG. 2 is a flow diagram of an encryption sequence for strong and weak crypto applications in the system of FIG. 1.

In FIG. 2, an encryption sequence 200 is shown for strong and weak applications. In step 201, the CDSA framework is initialized. After initialization, the application creates a crypto context in step 203. A test is performed in step 205 to determine if the application is privileged to perform strong crypto. A "no" condition initiates step 207 in which the application calls the encrypt data from the crypto module 21. A "yes" condition initiates step 209 in which the application requests the CSSM_EXEMPT_ALL privilege to allow the application to use strong crypto strengths in subsequent CSSM_EncryptData API calls.

Figure 3:
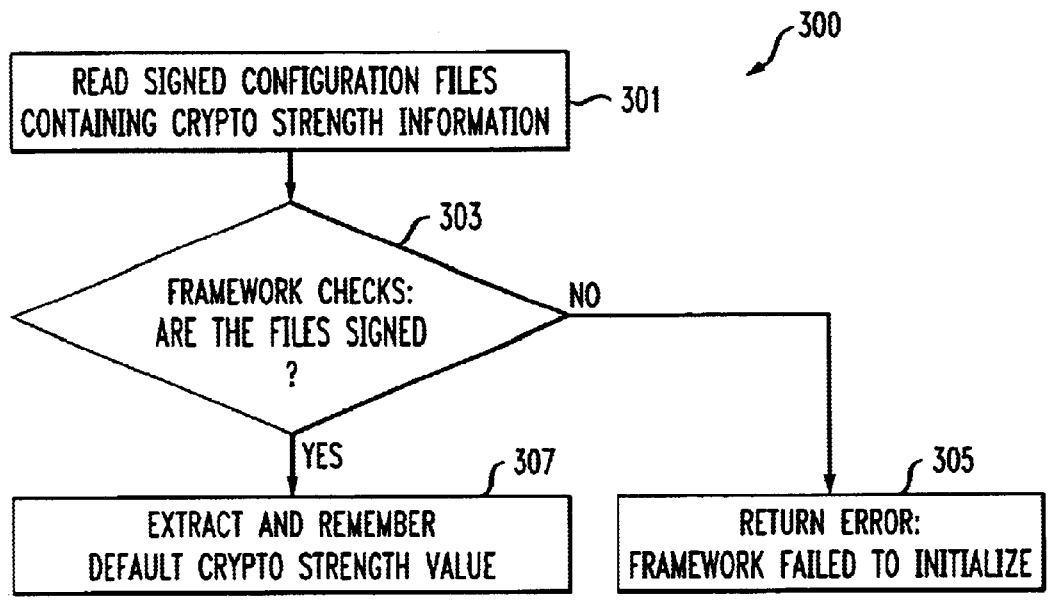
FIG. 3 is a flow diagram for the initialization of the CDSA framework in FIG. 1.

FIG. 3 describes an initialization sequence 300 for CDSA framework 12. In step 301 the CSSM reads the cryptographic policy configuration files containing the key lengths at which various algorithms are considered cryptographically strong. A test 303 is performed by the CDSA framework to determine whether the files are signed. A "no" condition initiates a step 305 to indicate an error code and that the framework failed to initialize; this condition forces an abort of the application since no CDSA API, cryptographically-related or not, can be called after such a failure. A "yes" condition initiates step 307 in which the framework extracts and remembers the default crypto strength values for the sequence 200.

Figure 4:
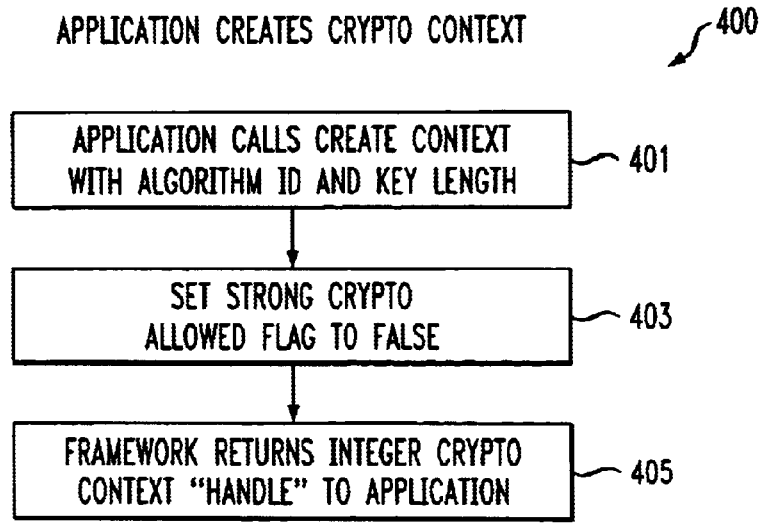
FIG. 4 is a flow diagram of an application creating a crypto context in the system of FIG. 1.

In FIG. 4 a create crypto context sequence 400 is initiated for the application 16. In step 401, the application calls the CSSM interface 14 to create a crypto context with an algorithm ID, key and key length provided by the CDSA framework. In step 403, the application sets the strong crypto allowed flag to FALSE; this way unprivileged applications will be restricted by default. In step 405, the framework returns an integer crypto context "handle" to the application. The "handle" includes an integer provided by the CDSA framework which is simply a way for the application to refer to the set of cryptographic parameters (often a large set) in subsequent API calls.

Figure 5:
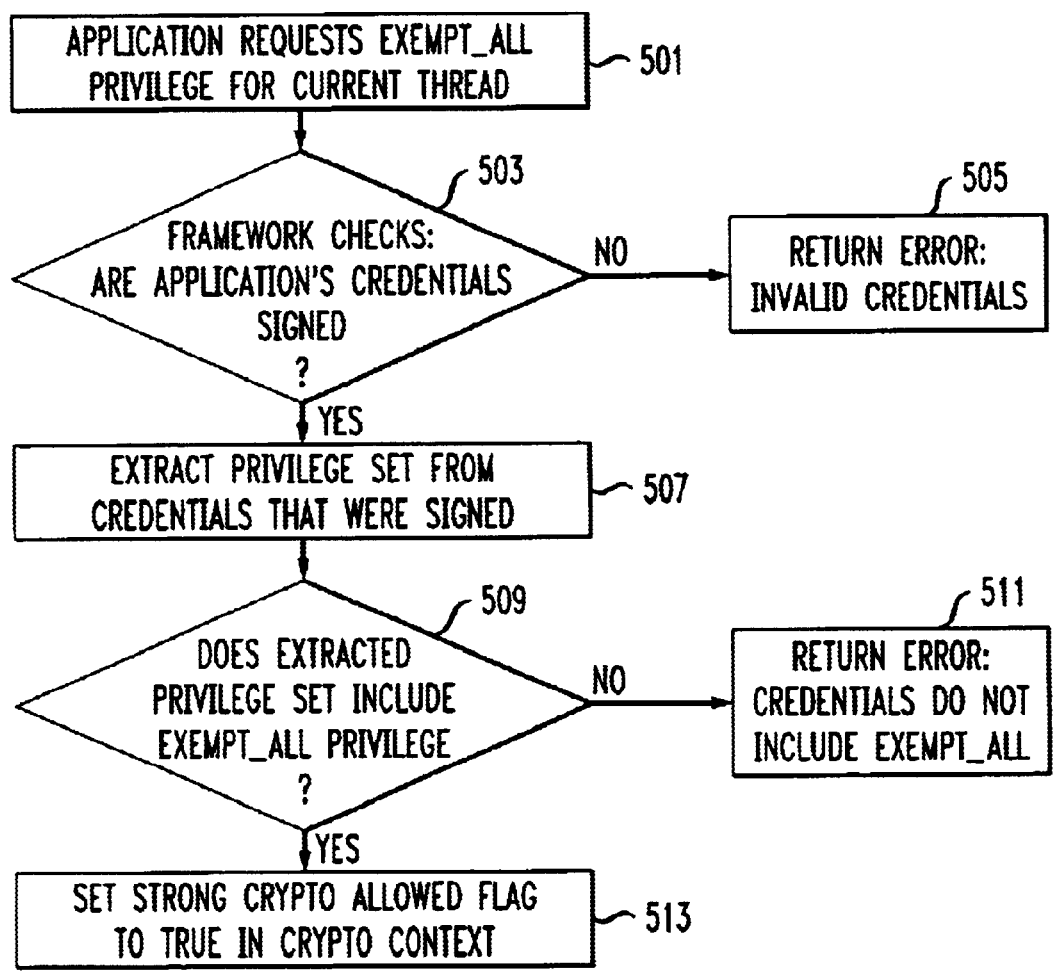
FIG. 5 is a flow diagram for requesting EXEMPT_ALL privilege in the system of FIG. 1.

Before describing FIG. 5 some background is necessary. In manufacture an application has either been signed by the CDSA framework vendor using a private key at the vendor's factory or it has not. The CDSA framework program code (a set of binary files distributed to customers) has embedded in it the public key matching the private key held at the factory. Hence, the CDSA framework can verify if an application file and its credential file have been signed at the factory with the vendor's private key by using the public key embedded in the CDSA framework program code.

Now turning to FIG. 5, a process 500 will now be described for initiating the CSSM_RequestExemption API with a parameter CSSM_EXEMPT_ALL signifying which privileges are being requested. In step 501, the application 16 requests the CSSM (another name for "framework") for the EXEMPT_ALL privilege for a current thread as a part of the encryption sequence 209 described in FIG. 2. A test 503 is performed by the CDSA framework to determine if the application credentials are signed. A "no" condition initiates step 505 in which the framework returns an error code for invalid credentials. A "yes" condition initiates step 507 to extract the privilege set from the credentials that were signed. A test 509 is performed to determine if the privilege set includes the privileges in the EXEMPT_ALL privilege set (e.g. represented as a bitmask). A "no" condition initiates step 511 in which the framework returns an error code that the credentials do not include the privileges in the EXEMPT_ALL privilege set. A "yes" condition initiates step 513 in which a strong crypto allowed flag is set to a "true" state in the crypto context.

FIG. 6 describes an encrypt data sequence 600 based upon the results of the process 500 in FIG. 5. In step 601, the application passes a crypto context "handle" as well as a data buffer to be encrypted. A test 603 is performed to determine if the requested crypto strength is greater than the default crypto strength. A "no" condition initiates step 605 to encrypt the data buffer with the default crypto strength. A "yes" condition initiates a test 607 to determine if the strong crypto allowed flag has been set to "true". A "no" condition returns an error code in step 609 that the application is not privileged to strong crypto. A "yes" condition encrypts the data buffer with a strong crypto strength using the crypto module 21 as authorized by the exemption mechanism 29 shown in FIG. 1 based upon the application credentials and digital signature provided by the manufacturer and contained in the application 16.

Summarizing, in the CDSA-I system 10 the CDSA framework 12 enforces the maximum cryptographic strength for each application 16 taking into account an exemption or privilege mechanism. If an application has no privilege, the CDSA framework will allow only the use of a default maximum cryptographic strength. However, if an application has a "strong crypto" privilege, the framework allows that application to access the strongest cryptographic strength available. Each application requiring privilege must be signed by a private key that is controlled by the CDSA framework vendor. Inside the CDSA framework, the corresponding public key is used to verify, at run times, that those applications were signed appropriately. The CDSA-I system 10 provides a dynamic, plug & play framework for varying maximum cryptographic strength for applications taking into account an exemption or privilege mechanism.

While the invention has been shown and described in conjunction with a specific embodiment, various changes can be made without departing from the spirit and scope of the invention as defined in the appended claims, in which:

We claim:

1. An improved cryptographic system for varying maximum cryptographic strength in common data security architecture applications, comprising:
   (a) a common data security architecture framework;
   (b) an application requiring cryptographic support and containing an exemption mechanism:
   (c) an application program interface coupling the framework to the application;
   (d) a plurality of pluggable modules defining cryptographic operations, digital certificates, and certificate revocation lists, and implementing crypto security policies defined by authorities and institutions;
   (e) a service provider interface for coupling the pluggable modules to the common data security architecture framework;
   (f) means for selectively digitally signing an application with an exempt privilege; and
   (g) means for allowing digitally signed applications to use strong crypto while unsigned digital applications are allowed to use weak crypto.

2. The improved cryptographic system of claim 1 further comprising:
   (h) means for providing signing the application with a private key.

3. The improved cryptographic system of claim 1 further comprising:
   (i) means for creating a crypto context in the application.

4. The improved cryptographic system of claim 1 further comprising:
   (j) means for initializing the common data security architecture framework and reading the application for cryptographic strength information.

5. The improved cryptographic system of claim 1 further comprising:
   (k) a data structure in the framework for processing exemption requests provided by the application.

6. In an improved cryptographic system supporting common data security architecture applications and including a common data security architecture framework coupled to an application requiring cryptographic support through an application interface and further coupled to a plurality of pluggable modules through a service provider interface, a method for varying cryptographic strength for the common data security architecture applications, comprising the steps of:
   (a) initializing the common data security architecture framework including reading and checking configuration files for crypto strength and signature;
   (b) creating a crypto context in the application with an algorithm ID and key length provided by the common data security architecture framework;
   (c) returning a crypto context handle to the application;
   (d) requesting an exempt all privilege for the current thread;
   (e) checking the application credentials for signatures;
   (f) extracting a privilege set from signed credentials;
   (g) determining if the privileged set includes an exempt all privilege;
   (h) setting a strong crypto allowed flag to true for a privilege application;
   (i) determining if the crypto strength is greater than the default crypto strength of the application;
   (j) determining if the strong crypto allowed flag is set to true; and
   (k) encrypting the application with strong crypto strength when the strong crypto allowed flag is set to true or returning and error code when the flag is not true.

7. The method of claim 6 further comprising the step of:
   (l) providing an exemption mechanism for the common data security architecture application.

8. The method of claim 7 further comprising the step of:
   (m) digitally signing the application.

9. The method of claim 8 further comprising the step of;
   (n) providing a private key for use in signing the application.

10. The method of claim 9 further comprising the step of:
    (o) checking a digitally signed application with an exemption attribute for cryptographic support of the application.

* * * * *